D. W. CARKHUFF.
DEVICE FOR OPERATING WAGON BRAKES.
No. 81,750. Patented Sept. 1, 1868.
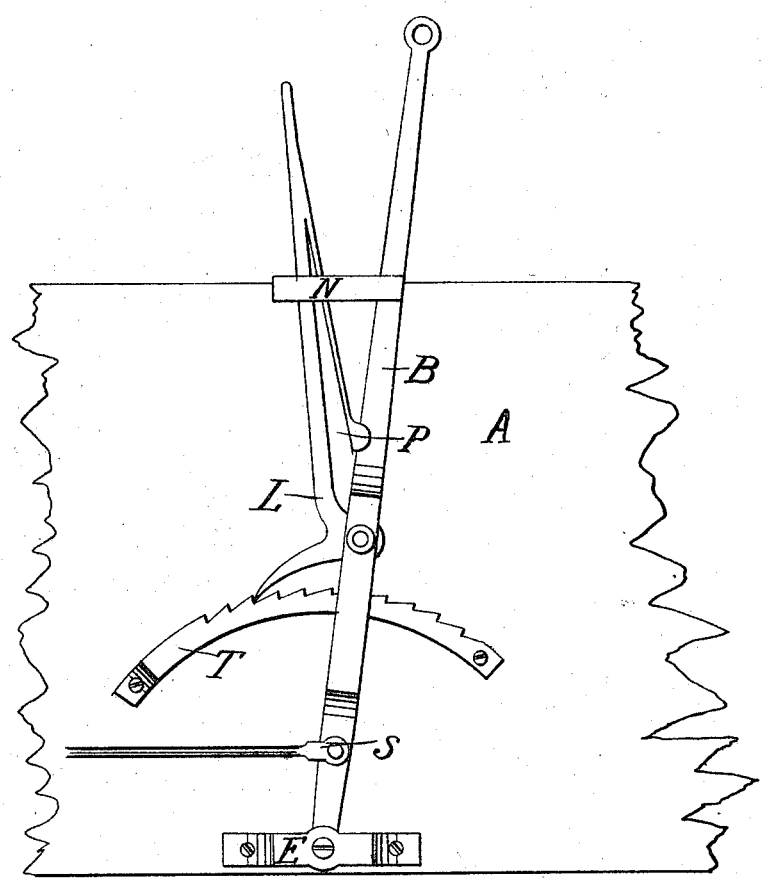
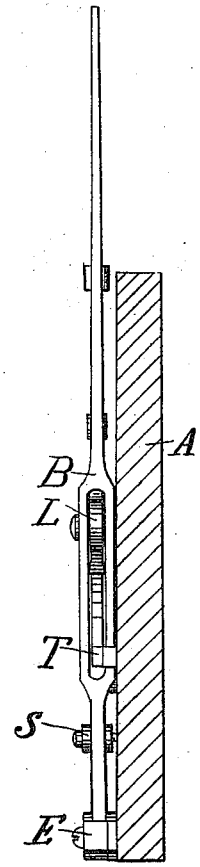

United States Patent Office.

DENNIS W. CARKHUFF, OF LAMBERTVILLE, NEW JERSEY.

*Letters Patent No. 81,750, dated September 1, 1868.*

IMPROVED DEVICE FOR OPERATING WAGON-BRAKES.

The Schedule referred to in these Letters Patent and making part of the same.

TO ALL WHOM IT MAY CONCERN:

Be it known that I, DENNIS W. CARKHUFF, of the town of Lambertville, in the county of Hunterdon, and State of New Jersey, have invented a new and improved Device for Operating Wagon-Brakes; and I do hereby declare that the following is a full, clear, and exact description thereof, reference being had to the accompanying drawings, and to the letters of reference marked thereon.

My improvement consists briefly in a more compact and desirable arrangement of the parts, and in the more convenient application of the same to the wagon.

A lever, one end of which is secured to the side of the wagon-box or body by means of a slotted plate and bolt, upon which said lever is movable lengthwise of the wagon a sufficient distance for the purpose desired, has a longitudinal slot, through which passes a segmental ratchet or notched plate, the ends of which are secured to the side of the wagon-body.

A pawl is placed above the ratchet-plate, movable upon a bolt or pin in the slot of the lever, having an end extending up nearly as high as the lever itself, between which and the lever a spring is placed. A guard is secured to the lever, through which the upper end of the pawl passes, securing it in its place and from injury.

A connection passes from the lever to the brake to be moved.

The operation is as follows:

The lever is pulled back, forcing the brake against the wheels of the wagon, while, at the same time, the spring presses the pawl into the notches of the ratchet, thereby securing the pressure obtained, and relieving the hand of the operator.

To throw the pressure off, pull back the pawl, lifting it from the notches, the manner of which cannot be misunderstood.

In the accompanying drawings—

Figure 1 is a side view, in which all the parts are clearly shown.

Figure 2 is an edge view, showing the manner of putting together.

The several letters in all the figures referring to the same parts.

A is the body or box of wagon.
B is the lever.
E is the slotted plate, to which lever is fastened.
L is the pawl.
P is the spring.
S is the connection to brake.
T is the ratchet or notched plate.
N is the guard securing the pawl.

What I claim as my invention, and desire to secure by Letters Patent, is—

A slotted lever, ratchet, pawl, spring, and guard, when made and applied in the form and manner, and for the purposes herein described and set forth.

DENNIS W. CARKHUFF.

Witnesses:
A. W. ANGEL,
F. ABBOTT.